United States Patent
Kostka, Jr. et al.

(10) Patent No.: US 10,094,287 B2
(45) Date of Patent: Oct. 9, 2018

(54) GAS TURBINE ENGINE COMPONENT WITH VASCULAR COOLING SCHEME

(71) Applicant: UNITED TECHNOLOGIES CORPORATION, Hartford, CT (US)

(72) Inventors: Stanislav Kostka, Jr., Shrewsbury, MA (US); Frank J. Cunha, Avon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 676 days.

(21) Appl. No.: 14/618,298

(22) Filed: Feb. 10, 2015

(65) Prior Publication Data
US 2016/0230662 A1 Aug. 11, 2016

(51) Int. Cl.
| | |
|---|---|
| F02C 7/18 | (2006.01) |
| F23R 3/00 | (2006.01) |
| F01D 5/18 | (2006.01) |
| F01D 25/08 | (2006.01) |

(52) U.S. Cl.
CPC ............... *F02C 7/18* (2013.01); *F01D 5/187* (2013.01); *F01D 25/08* (2013.01); *F23R 3/005* (2013.01); *F05D 2260/2212* (2013.01); *F05D 2260/22141* (2013.01)

(58) Field of Classification Search
CPC . F02C 7/18; F01D 25/08; F01D 5/187; F01D 5/186; F01D 5/181; F01D 5/183; F01D 5/188; F01D 25/12; F23R 3/005; F05D 2260/22141; F05D 2260/2212; F05D 2260/207; F05D 2260/208; F05D 2260/202; F05D 2260/204

USPC .................................. 416/97 A; 415/114
See application file for complete search history.

(56) References Cited

U.S. PATENT DOCUMENTS

| | | |
|---|---|---|
| 3,584,972 A | 6/1971 | Bratkovich et al. |
| 3,864,199 A | 2/1975 | Meginnis |
| 3,900,629 A | 8/1975 | Spencer |
| 4,004,056 A | 1/1977 | Carroll |
| 4,091,146 A | 5/1978 | Darrow et al. |
| 4,168,348 A | 9/1979 | Bhangu et al. |
| 4,269,032 A | 5/1981 | Meginnis et al. |
| 4,292,376 A | 9/1981 | Hustler |
| 4,302,940 A | 12/1981 | Meginnis |
| 4,359,181 A | 11/1982 | Chisholm |
| 4,440,834 A | 4/1984 | Aubert et al. |
| 4,751,962 A | 6/1988 | Havekost et al. |

(Continued)

FOREIGN PATENT DOCUMENTS

| | | |
|---|---|---|
| DE | 10261071 A1 | 7/2004 |
| EP | 0475658 A1 | 3/1992 |

(Continued)

OTHER PUBLICATIONS

Extended European Search Report for European Application No. 16154698.1 dated Jun. 1, 2016.

*Primary Examiner* — Ian Paquette
(74) *Attorney, Agent, or Firm* — Carlson, Gaskey & Olds, P.C.

(57) ABSTRACT

A component according to an exemplary aspect of the present disclosure includes, among other things, a body portion and a cooling scheme disposed inside the body portion, the cooling scheme including a vascular engineered lattice structure and a heat transfer device adjacent to the vascular engineered lattice structure.

25 Claims, 5 Drawing Sheets

(56) References Cited

U.S. PATENT DOCUMENTS

| | | |
|---|---|---|
| 5,193,611 A | 3/1993 | Hesselgreaves |
| 5,353,867 A | 10/1994 | Jaspers |
| 5,370,499 A | 12/1994 | Lee |
| 5,545,003 A | 8/1996 | O'Connor et al. |
| 5,607,778 A | 3/1997 | Padden |
| 5,660,523 A | 8/1997 | Lee |
| 5,752,801 A | 5/1998 | Kennedy |
| 5,960,863 A | 10/1999 | Hua |
| 5,975,841 A | 11/1999 | Lindemuth et al. |
| 6,126,396 A | 10/2000 | Doughty et al. |
| 6,167,952 B1 | 1/2001 | Downing |
| 6,235,370 B1 | 5/2001 | Merrill et al. |
| 6,397,922 B1 | 6/2002 | Sachs et al. |
| 6,412,541 B2 | 7/2002 | Roesler |
| 6,508,623 B1 | 1/2003 | Shiozaki et al. |
| 6,511,762 B1 | 1/2003 | Lee et al. |
| 6,599,568 B2 | 7/2003 | Lee et al. |
| 6,617,003 B1 | 9/2003 | Lee et al. |
| 6,629,559 B2 | 10/2003 | Sachs et al. |
| 6,761,956 B2 | 7/2004 | Lee et al. |
| 6,955,523 B2 | 10/2005 | McClelland |
| 7,048,986 B2 | 5/2006 | Shah et al. |
| 7,063,131 B2 | 6/2006 | Northrop |
| 7,070,853 B2 | 7/2006 | Paul |
| 7,141,812 B2 | 11/2006 | Appleby |
| 7,144,220 B2 | 12/2006 | Marcin |
| 7,153,464 B2 | 12/2006 | Millard et al. |
| 7,204,089 B2 | 4/2007 | Schreiber |
| 7,294,164 B2 | 11/2007 | Merkel |
| 7,402,335 B2 | 7/2008 | Balms et al. |
| 7,500,828 B2 | 3/2009 | Landis |
| 7,540,710 B2 | 6/2009 | Grote et al. |
| 7,597,533 B1 | 10/2009 | Liang |
| 7,658,590 B1 | 2/2010 | Spanks |
| 7,670,675 B2 | 3/2010 | Heselhaus |
| 7,695,247 B1 * | 4/2010 | Liang ............... F01D 5/186 416/193 A |
| 7,717,677 B1 | 5/2010 | Liang |
| 7,766,615 B2 * | 8/2010 | Spangler ............... F01D 5/187 416/1 |
| 7,775,766 B2 | 8/2010 | Meier et al. |
| 7,785,098 B1 | 8/2010 | Appleby et al. |
| 7,810,552 B2 | 10/2010 | Slaughter |
| 7,866,372 B2 | 1/2011 | Slaughter |
| 7,866,377 B2 | 1/2011 | Slaughter |
| 7,968,144 B2 | 6/2011 | James et al. |
| 8,052,389 B2 | 11/2011 | Kopmels |
| 8,167,573 B2 | 5/2012 | Merrill et al. |
| 8,257,809 B2 | 9/2012 | Morrison et al. |
| 8,327,911 B2 | 12/2012 | Kush et al. |
| 8,807,945 B2 * | 8/2014 | Spangler ............... F01D 5/187 416/97 R |
| 8,951,004 B2 * | 2/2015 | Lee ............... F01D 5/187 415/115 |
| 2005/0045306 A1 | 3/2005 | Petervary et al. |
| 2006/0099074 A1 | 5/2006 | Kopmels |
| 2006/0251515 A1 | 11/2006 | Landis |
| 2006/0285975 A1 | 12/2006 | Landis |
| 2007/0031252 A1 | 2/2007 | Walters et al. |
| 2007/0214759 A1 | 9/2007 | Merkel |
| 2007/0243069 A1 | 10/2007 | Read |
| 2007/0275210 A1 | 11/2007 | Heselhaus |
| 2008/0254276 A1 | 10/2008 | James |
| 2009/0011919 A1 | 1/2009 | Noguchi et al. |
| 2010/0284798 A1 | 11/2010 | Campbell et al. |
| 2010/0291401 A1 | 11/2010 | Medina et al. |
| 2011/0262695 A1 | 10/2011 | Lee et al. |
| 2011/0265406 A1 | 11/2011 | Morrison et al. |
| 2011/0268580 A1 | 11/2011 | Bryk et al. |
| 2011/0293434 A1 | 12/2011 | Lee et al. |
| 2012/0006518 A1 | 1/2012 | Lee et al. |
| 2012/0034075 A1 | 2/2012 | Hsu et al. |
| 2012/0237786 A1 | 9/2012 | Morrison et al. |
| 2012/0243970 A1 | 9/2012 | Hellgren et al. |
| 2012/0291991 A1 | 11/2012 | Denkenberger |
| 2013/0001837 A1 | 1/2013 | Gohler et al. |
| 2014/0328669 A1 * | 11/2014 | Bregman ............... F01D 5/187 415/115 |

FOREIGN PATENT DOCUMENTS

| | | |
|---|---|---|
| EP | 0896127 B1 | 2/1999 |
| EP | 2199725 A1 | 6/2010 |
| EP | 2947274 | 11/2015 |
| EP | 3020924 | 5/2016 |
| GB | 2284825 A | 6/1995 |
| WO | 2003006883 A1 | 1/2003 |
| WO | 2007014005 A1 | 2/2007 |
| WO | 2011069015 A1 | 12/2010 |
| WO | 2011069015 A3 | 6/2011 |
| WO | 2011133359 A1 | 10/2011 |
| WO | 2013013995 A1 | 1/2013 |
| WO | 2014105108 | 7/2014 |

* cited by examiner

GAS TURBINE ENGINE COMPONENT WITH VASCULAR COOLING SCHEME

BACKGROUND

This disclosure relates to a gas turbine engine, and more particularly to a vascular cooling scheme for a gas turbine engine component.

Gas turbine engines typically include a compressor section, a combustor section and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

Due to exposure to hot combustion gases, numerous components of the gas turbine engine may include cooling schemes that circulate airflow to cool the component during engine operation. Thermal energy is transferred from the component to the airflow as the airflow circulates through the cooling scheme to cool the component. Improved cooling schemes are desired.

SUMMARY

A component according to an exemplary aspect of the present disclosure includes, among other things, a body portion and a cooling scheme disposed inside the body portion, the cooling scheme including a vascular engineered lattice structure and a heat transfer device adjacent to the vascular engineered lattice structure.

In a further non-limiting embodiment of the foregoing component, the vascular engineered lattice structure is a hollow vascular structure in which airflow is communicated inside hollow passages of one or more nodes and branches of the vascular engineered lattice structure.

In a further non-limiting embodiment of either of the foregoing components, the vascular engineered lattice structure is a solid structure in which airflow is communicated around and over one or more nodes and branches of the vascular engineered lattice structure.

In a further non-limiting embodiment of any of the foregoing components, the body portion is part of an airfoil.

In a further non-limiting embodiment of any of the foregoing components, the body portion is part of a combustor liner panel.

In a further non-limiting embodiment of any of the foregoing components, the heat transfer device is disposed upstream from the vascular engineered lattice structure.

In a further non-limiting embodiment of any of the foregoing components, the heat transfer device is disposed downstream from the vascular engineered lattice structure.

In a further non-limiting embodiment of any of the foregoing components, the heat transfer device includes a plurality of trip strips.

In a further non-limiting embodiment of any of the foregoing components, the heat transfer device includes a plurality of pins.

In a further non-limiting embodiment of any of the foregoing components, the heat transfer device includes a plurality of dimples.

In a further non-limiting embodiment of any of the foregoing components, the heat transfer device includes a plurality of chevron trip strips.

In a further non-limiting embodiment of any of the foregoing components, the cooling scheme includes a second heat transfer device different from the heat transfer device.

A component according to another exemplary aspect of the present disclosure includes, among other things, a wall and a cooling scheme formed inside the wall, the cooling scheme including a vascular engineered lattice structure and a first heat transfer device different from the vascular engineered lattice structure.

In a further non-limiting embodiment of the foregoing component, the vascular engineered lattice structure is disposed upstream from the first heat transfer device.

In a further non-limiting embodiment of either of the foregoing components, the vascular engineered lattice structure is disposed downstream from the first heat transfer device.

In a further non-limiting embodiment of any of the foregoing components, the cooling scheme includes a second heat transfer device different from the first heat transfer device.

In a further non-limiting embodiment of any of the foregoing components, the cooling scheme includes a third heat transfer device different from each of the first heat transfer device and the second heat transfer device.

In a further non-limiting embodiment of any of the foregoing components, the first heat transfer device includes one of trips strips, chevrons, pins and dimples.

In a further non-limiting embodiment of any of the foregoing components, the cooling scheme is disposed in a trailing edge portion of the component.

In a further non-limiting embodiment of any of the foregoing components, the vascular engineered lattice structure includes a plurality of nodes and a plurality of branches that extend between the plurality of nodes.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes a gas turbine engine component having an internal cooling scheme. The cooling scheme is disposed inside a body portion of the component and is configured for cooling the component. The cooling scheme may include a vascular engineered lattice structure in combination with one or more additional heat transfer devices (e.g., trip strips, pins, dimples, chevrons, etc.). These and other features are discussed in greater detail in the following paragraphs of this detailed description.

Figure 1:
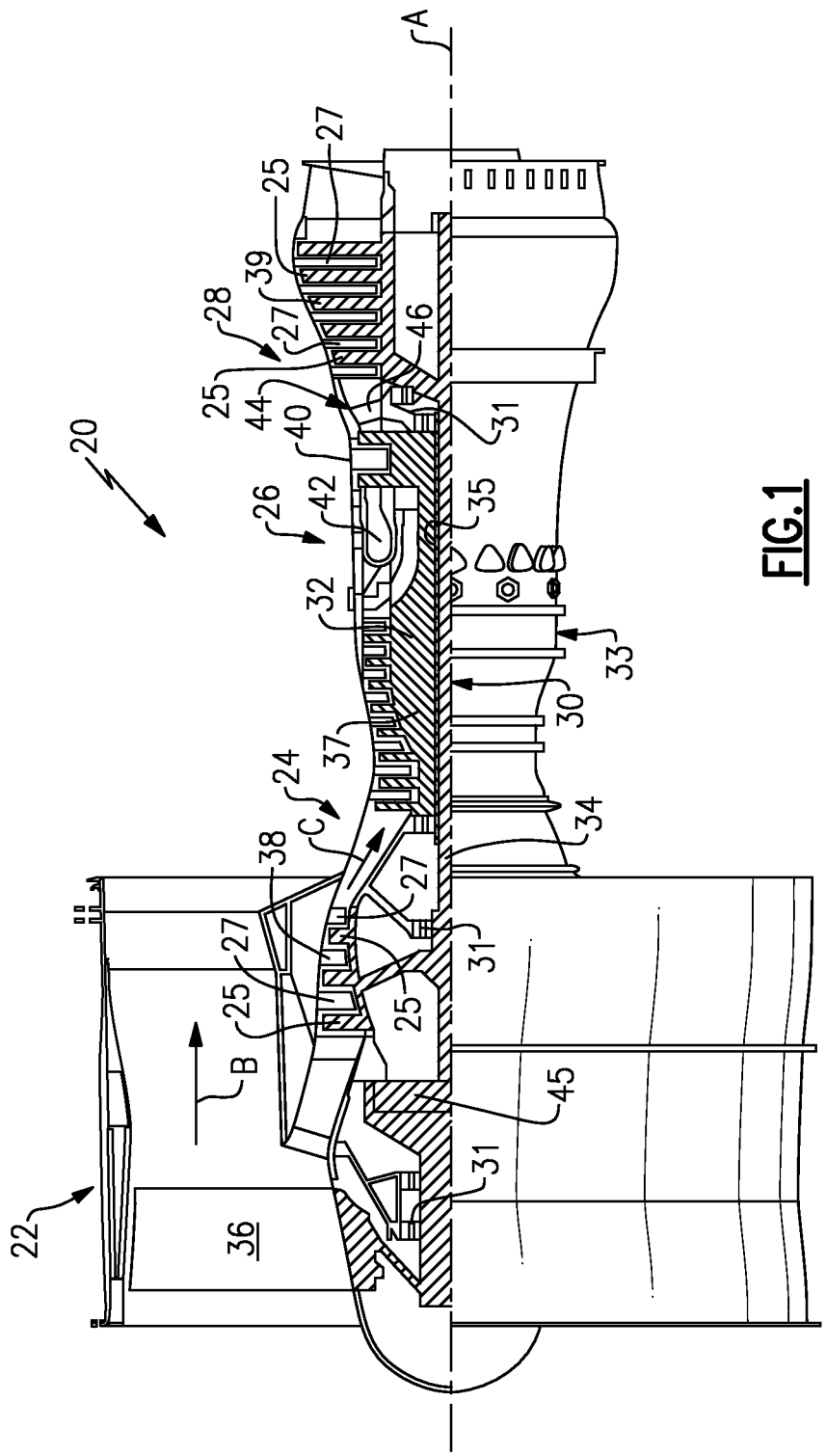
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only exemplary of one embodiment of a geared architecture engine and that the present disclosure is applicable to other gas turbine engines, including direct drive turbofans.

In this embodiment of the exemplary gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(Tram\ °\ R)/(518.7°\ R)]^{0.5}$. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 create or extract energy (in the form of pressure) from the core airflow that is communicated through the gas turbine engine 20 along the core flow path C. The vanes 27 direct the core airflow to the blades 25 to either add or extract energy.

Various components of the gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling schemes for cooling the parts during engine operation.

Among other features, this disclosure details gas turbine engine component cooling schemes that include vascular engineered lattice structures inside the walls of the gas turbine engine component. The exemplary structures described herein provide effective localized convective cooling for gas turbine engine components that may be subject to the hot combustion gases that are communicated through the core flow path C.

Figure 2:
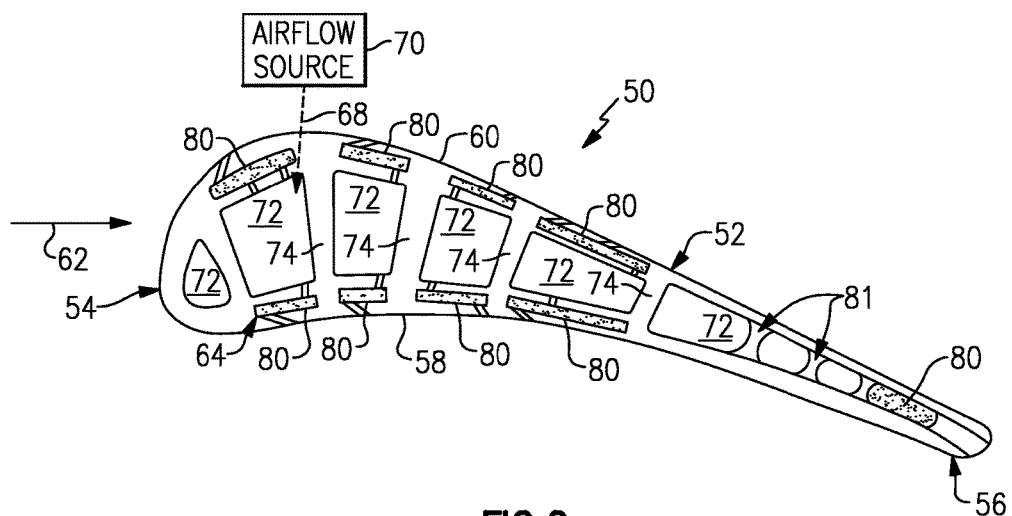
FIG. 2 illustrates a component of a gas turbine engine.

FIG. 2 illustrates a component 50 that can be incorporated into a gas turbine engine, such as the gas turbine engine 20 of FIG. 1. The component 50 includes a body portion 52 that axially extends between a leading edge portion 54 and a trailing edge portion 56. The body portion 52 may further include a first (pressure) side wall 58 and a second (suction) side wall 60 that are spaced apart from one another and axially extend between the leading edge portion 54 and the trailing edge portion 56. Although shown in cross-section, the body portion 52 would also include a radial dimension that extends in span across the component 50.

Figure 3:
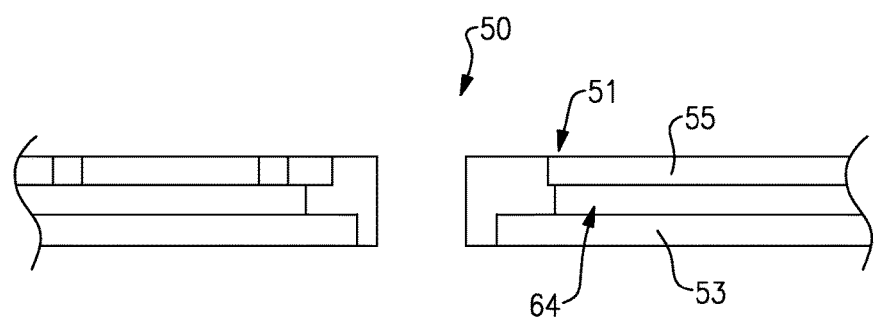
FIG. 3 illustrates a segment of a combustor liner grommet.

In this embodiment, the body portion 52 is representative of an airfoil. For example, the body portion 52 could be an airfoil that extends from platform and root portions (i.e., where the component is a blade), or could alternatively extend between inner and outer platforms (i.e., where the component 50 is a vane). In yet another embodiment, the component 50 could include a non-airfoil component, such as a combustor liner panel 51 that includes a gas path inner wall 53 and a cold stream outer wall 55 (see FIG. 3). However, this disclosure extends to any gas turbine engine part that could benefit from dedicated cooling.

A gas path 62 is communicated axially downstream through the gas turbine engine 20 in a direction that extends from the leading edge portion 54 toward the trailing edge portion 56 of the body portion 52. The gas path 62 represents the communication of core airflow along the core flow path C (see FIG. 1).

A cooling scheme 64 may be disposed inside of the body portion 52 for cooling the internal and external surfaces of the component 50. For example, the cooling scheme 64 can include one or more cavities 72 that may radially, axially and/or circumferentially extend inside of the body portion 52 to establish cooling passages for receiving airflow 68 (or some other fluid). The airflow 68 may be communicated into one or more of the cavities 72 from an airflow source 70 that is external to the component 50 to cool the component 50. In one non-limiting embodiment, the airflow 68 is communicated to the cooling scheme 64 through a root portion of the component 50 (e.g., where the component is a blade).

The airflow 68 generally includes a lower temperature than the airflow of the gas path 62 that is communicated across the body portion 52. In one particular embodiment, the airflow 68 is a bleed airflow that can be sourced from the compressor section 24 or any other portion of the gas turbine engine 20 that has a lower temperature compared to the component 50. The airflow 68 can be circulated through the cooling scheme 64 to transfer thermal energy from the component 50 to the airflow 68, thereby cooling the component 50.

In this non-limiting embodiment, the exemplary cooling scheme 64 includes a plurality of cavities 72 that extend inside of the body portion 52. However, the cooling scheme 64 is not necessarily limited to the configuration shown, and it will be readily appreciated that a greater or fewer number of cavities, including only a single cavity, may be defined inside of the body portion 52. The cavities 72 communicate the airflow 68 through the cooling scheme 64, such as along a serpentine or linear path, to cool the body portion 52.

Ribs 74 may extend between the first side wall 58 and the second side wall 60 of the body portion 52. The ribs 74 radially extend across a span of the body portion 52.

The exemplary cooling scheme 64 may include one or more vascular engineered lattice structures 80 that are disposed inside the body portion 52 of the component 50. For example, discrete portions of the component 50 may embody a vascular engineered lattice structure. The cooling scheme 64 may also employ one or more heat transfer devices 81 in combination with the vascular engineered lattice structures 80. Multiple embodiments of such cooling schemes are described in detail below.

FIGS. 4-8 illustrate multiple exemplary cooling schemes that may be employed to cool a gas turbine engine component 50. The cooling schemes may be incorporated into any section or sections of a gas turbine engine component. Although a specific combination of heat transfer devices is illustrated in each of FIGS. 4-8, this disclosure is not limited to the exact configurations shown. In other words, this disclosure extends to any combination of heat transfer devices for cooling the component 50. The combination of features that make up each cooling scheme can be selected to achieve a desired amount of heat transfer capability.

Figure 4:
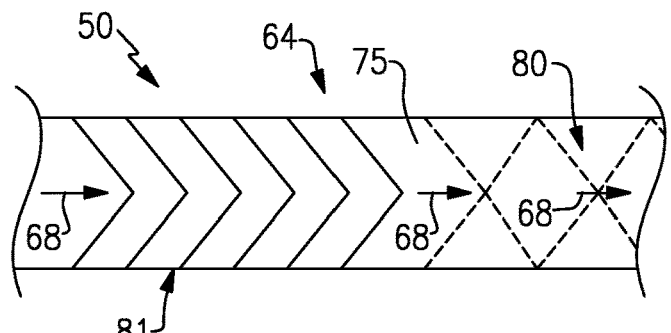
FIGS. 4, 5, 6, 7 and 8 illustrate exemplary cooling schemes that may be employed to cool a gas turbine engine component.
Figure 5:
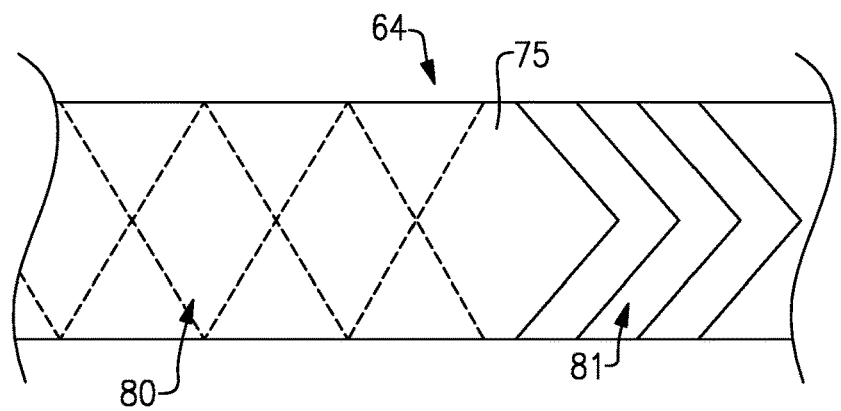

FIG. 4 illustrates a cooling scheme 64. The cooling scheme 64 may be formed inside a wall 75 of the component 50. In one embodiment, the cooling scheme 64 includes a vascular engineered lattice structure 80 (shown schematically) and a heat transfer device 81 adjacent to the vascular engineered lattice structure 80. The vascular engineered lattice structure 80 and the heat transfer device 81 may extend from the wall 75, or could extend between multiple walls (e.g., between pressure and suction side walls of an airfoil, between inner and outer combustor panel walls, etc.). The heat transfer device 81 is a non-vascular structure, in this embodiment. The heat transfer device 81 combines with the vascular engineered lattice structure 80 to provide a cooling scheme that achieves a relatively high heat transfer effect with a minimum amount of pressure drop penalty.

In one non-limiting embodiment, the heat transfer device 81 includes one or more trips strips, such as chevron trip strips, positioned upstream from the vascular engineered lattice structure 80. However, the heat transfer device 81 could alternatively be positioned downstream from the vascular engineered lattice structure 80 (see FIG. 5). Airflow 68 may be circulated through the cooling scheme 64, including across the heat transfer device 81 and through the vascular engineered lattice structure 80, to pick-up heat from the component 50.

Figure 6:
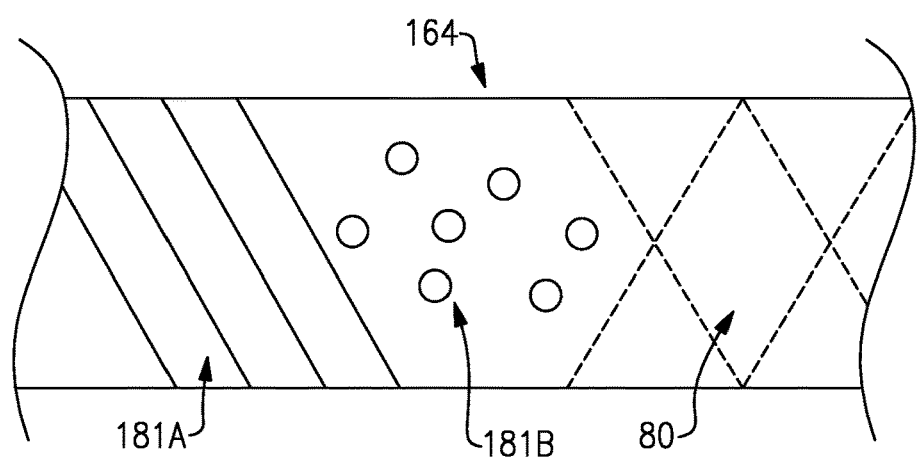

FIG. 6 illustrates another exemplary cooling scheme 164. In this embodiment, the cooling scheme 164 includes a first heat transfer device 181A, a second heat transfer device 181B and a vascular engineered lattice structure 80. The first heat transfer device 181A may include trip strips and the second heat transfer device 181B may include pins. In other words, the second heat transfer device 181B is a different heat transfer device from the first heat transfer device 181A. The first heat transfer device 181A and the second heat transfer device 181B are disposed upstream from the vascular engineered lattice structure 80, in this non-limiting embodiment.

Figure 7:
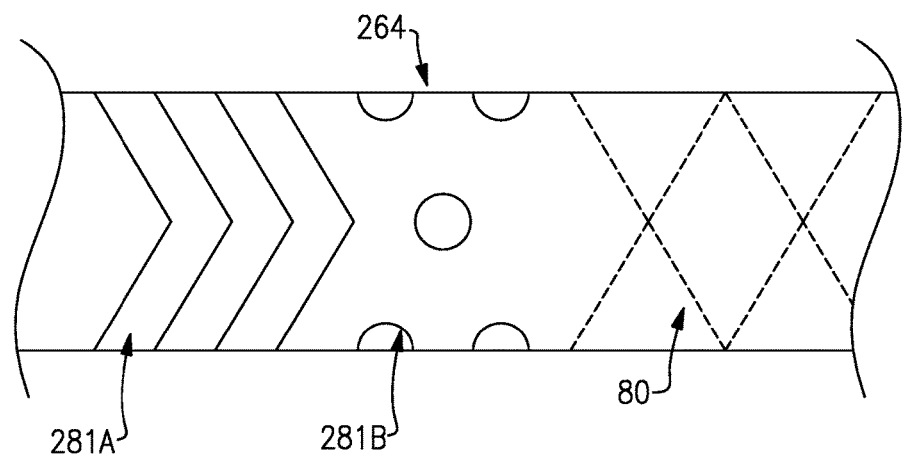

Another cooling scheme 264 is illustrated in FIG. 7. The cooling scheme 264 includes a first heat transfer device 281A, a second heat transfer device 281B and a vascular engineered lattice structure 80. The first heat transfer device 281A may include chevron trip strips and the second heat transfer device 281B may include dimples.

Figure 8:
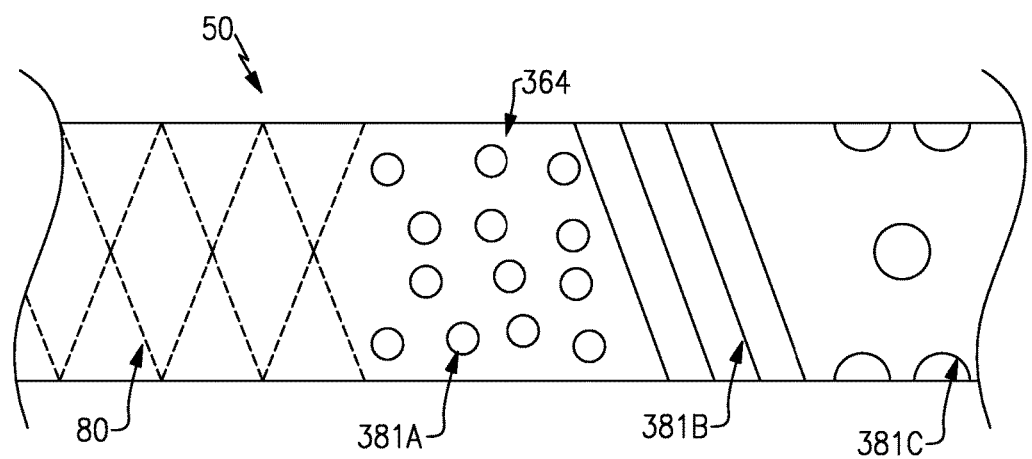

FIG. 8 illustrates yet another exemplary cooling scheme 364 that may be employed to cool a gas turbine engine component 50. In this embodiment, the cooling scheme 364 includes a vascular engineered lattice structure 80, a first heat transfer device 381A, a second heat transfer device 381B and a third heat transfer device 381C. The first heat transfer device 381A may include pins, the second heat transfer device 381B may include trip strips, and the third heat transfer device 381C may include dimples. In other words, each of the heat transfer devices 381A, 381B and 381C are a different type of heat transfer device. In this non-limiting embodiment, the vascular engineered lattice structure 80 is upstream from the heat transfer devices 381A, 381B and 381C.

Figure 9:
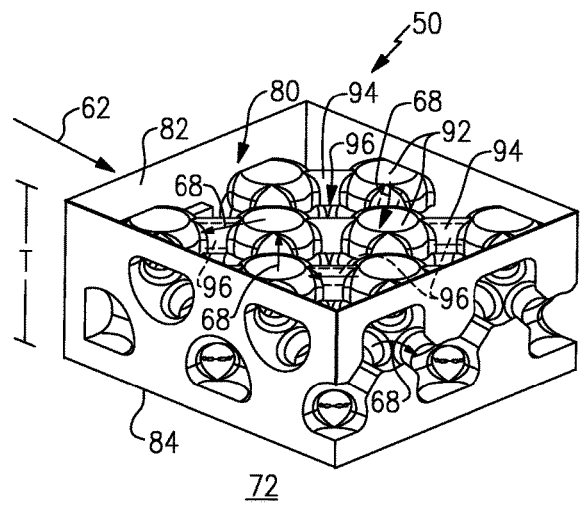
FIG. 9 illustrates an exemplary vascular engineered lattice structure of a cooling scheme.
Figure 10:
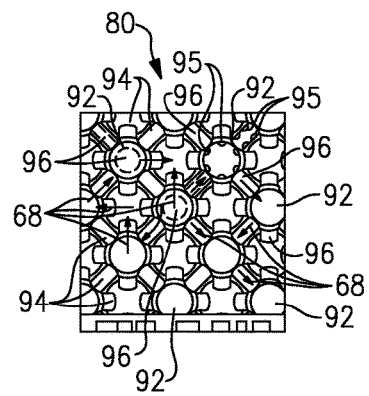
FIG. 10 illustrates another view of the vascular engineered lattice structure of FIG. 9.

FIGS. 9 and 10 illustrate one exemplary vascular engineered lattice structure 80 that can be incorporated into any of the cooling schemes 64, 164, 264 and 364 described above. The vascular engineered lattice structure 80 may be incorporated into any section or sections of a gas turbine engine component. In this disclosure, the term "vascular engineered lattice structure" denotes a structure of known surface and flow areas that includes a specific structural integrity.

As discussed in greater detail below, the vascular engineered lattice structure 80 of FIGS. 9 and 10 is a hollow vascular structure. The hollow vascular structure shown in FIGS. 9 and 10 defines a solid material with discrete, interconnected cooling passages that are connected through common nodes to control the flow of airflow throughout the hollow vascular structure.

The specific design and configuration of the vascular engineered lattice structure 80 of FIG. 9 is not intended to limiting. It will be appreciated that because the vascular engineered lattice structure 80 is an engineered structure, the vascular arrangement of these structures can be tailored to the specific cooling and structural needs of any given gas turbine engine component or section of the component. In other words, the vascular engineered lattice structure 80 can be tailored to match external heat load and local life requirements by changing the design and density of the vascular engineered lattice structure 80. The actual design of any given vascular engineered lattice structure may depend on geometry requirements, pressure loss, local cooling flow, cooling air heat pickup, thermal efficiency, overall cooling effectiveness, aerodynamic mixing, and produceability considerations, among other gas turbine engine specific parameters. In one embodiment, the vascular engineered lattice structure 80 is sized based on a minimum size that can be effectively manufactured and that is not susceptible to becoming plugged by dirt or other debris.

The exemplary vascular engineered lattice structure 80 extends between a first wall 82 and a second wall 84 of the component 50. The first wall 82 is spaced from the first wall 82. The first wall 82 may be exposed to a gas path 62, whereas the second wall 84 may be remotely positioned from the gas path 62. For example, the second wall 84 could face into one of the cooling source cavities 72 of the cooling scheme 64 (see, for example, FIG. 2). The vascular engineered lattice structure 80 includes a thickness T between the first wall 82 and the second wall 84. The thickness T can be of any dimension.

Airflow 68 filters through the vascular engineered lattice structure 80 to convectively cool the component 50. In this disclosure, the term "through" is defined to include either inside of or around the vascular surfaces of the vascular engineered lattice structure 80. In one embodiment, the vascular engineered lattice structure 80 embodies a hollow configuration in which the airflow 68 may be circulated inside of the various passages defined by the vascular engineered lattice structure 80. For example, the hollow configuration of the vascular engineered lattice structure 80 may establish a porous flow area for the circulation of airflow 68. Additionally, airflow 68 could be communicated over and around the vascular engineered lattice structure 80.

The vascular engineered lattice structure 80 can be manufactured by using a variety of manufacturing techniques. For example, the vascular engineered lattice structure 80 may be created using an additive manufacturing process such as direct metal laser sintering (DMLS). Another additive manufacturing process that can be used to manufacture the vascular engineered lattice structure 80 is electron beam melting (EBM). In another embodiment, select laser sintering (SLS) or select laser melting (SLM) processes may be utilized.

In yet another embodiment, a casting process can be used to create the vascular engineered lattice structure 80. For example, an additive manufacturing process can be used to produce a refractory metal core (RMC), including but not limited to a molybdenum core, that can be used to cast the vascular engineered lattice structure 80. In one embodiment, the additive manufacturing process includes utilizing a powder bed technology and the casting process includes a lost wax process.

The exemplary vascular engineered lattice structure 80 includes a plurality of nodes 92, a plurality of branches 94 that extend between the nodes 92, and a plurality of hollow passages 96 between the branches 94 and the nodes 92. The number, size and distribution of nodes 92, branches 94 and hollow passages 96 can vary from the specific configuration shown. In other words, the configuration illustrated by FIG. 9 is but one possible design.

The branches 94 may extend orthogonally or non-orthogonally to the nodes 92. The nodes 92 and branches 94 can be manufactured as a single contiguous structure made of the same material. In one embodiment, the nodes 92 and branches 94 are uniformly distributed throughout the vascular engineered lattice structure 80. In another embodiment, the nodes 92 and branches 94 are non-uniformly distributed throughout the vascular engineered lattice structure 80.

In this "hollow lattice" structure configuration, airflow 68 can be circulated inside hollow passages 96 of the nodes 92 and the branches 94 to cool the component 50 in the space between the walls 82, 84 (see FIG. 9). For example, the "hollow" lattice structure may include multiple continuous hollow spoke cavity passages 96 thru which airflow 68 is passed. The airflow 68 flows from each of the hollow branches 94 and coalesces into the nodes 92, which serve as a plenum for the airflow 68 to be redistributed to the next set of hollow branches 94 and nodes 92. The "hollow" lattice structure forms multiple circuitous continuous passages in which the airflow 68 flows to maximize the internal convective cooling surface area and coolant mixing. Additionally, airflow 68 could be communicated over and around the nodes 92 and branches 94 of the vascular engineered lattice structure 80.

The nodes 92 and the branches 94 additionally act as structural members that can be tailored to "tune" steady and unsteady airfoil vibration responses in order to resist and optimally manage steady and unsteady pressure forces, centrifugal bending and curling stresses, as well as provide for improved airfoil local and section average creep and untwist characteristics and capability. In one embodiment, one or more of the nodes 92 and branches 94 may include augmentation features 95 (shown schematically in FIG. 10) that augment the heat transfer effect of the airflow 68 as it is communicated through the vascular engineered lattice structure 80. The augmentation features 95 can also be made using the additive manufacturing processes describe above.

As mentioned above, the vascular arrangement of the vascular engineered lattice structure 80 can be tailored to the specific cooling and structural needs of any given gas turbine engine component. For example, a first portion of the vascular engineered lattice structure 80 can include a different combination of nodes 92, branches 94 and hollow passages 96 compared to a second portion of the vascular engineered lattice structure 80. In one embodiment, a first portion of the vascular engineered lattice structure 80 may include a greater amount of cooling area whereas a second portion of the vascular engineered lattice structure 80 may provide a greater amount of structural area.

Figure 11:
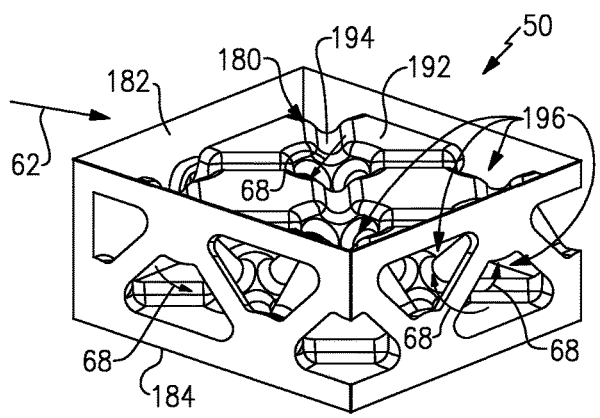
FIG. 11 illustrates another exemplary vascular engineered lattice structure.
Figure 12:
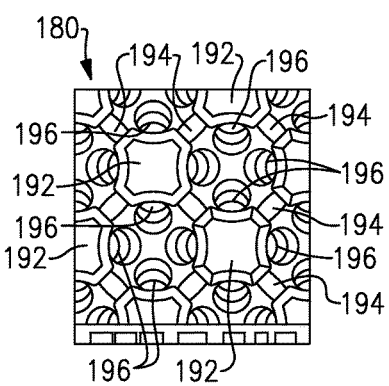
FIG. 12 illustrates another view of the vascular engineered lattice structure of FIG. 11.

FIGS. 11 and 12 illustrate another exemplary vascular engineered lattice structure 180 that can be incorporated into any of the cooling schemes 64, 164, 264 and 364 described above. In this embodiment, the vascular engineered lattice structure 180 embodies a solid lattice structure in which airflow is communicated over and around the solid lattice structure thereby governing flow and providing structural support. The vascular engineered lattice structure 180 is disposed between a first wall 182 and a second wall 184 of the component 50.

The vascular engineered lattice structure 180 includes a plurality of nodes 192, a plurality of branches 194 that extend between the nodes 92, and a plurality of open passages 196 between the branches 194 and the nodes 192. The nodes 192, branches 194 and open passages 196 can be manufactured as a single contiguous structure made of the same material.

In this "solid" lattice structure configuration, airflow 68 can be circulated through the open passages 196 to cool the component 50 in the space between the walls 182, 184. In other words, in contrast to the hollow lattice structure embodiment which communicates airflow through the insides of the nodes 192 and branches 194, the airflow 68 is circulated over and around these parts as part of a porous flow area. For example, the "solid" lattice structure includes multiple continuous solid branches 194 over which airflow 68 is passed. The "solid" lattice structure forms circuitous passages for the airflow 68 to traverse around as it migrates through the vascular engineered lattice structure to maximize the convective cooling surface area and coolant mixing around the nodes 192 and the branches 194. The nodes 192 and the branches 194 additionally act as structural members that resist pressure, rotation forces, and loads.

The exemplary vascular engineered lattice structure 180 establishes a ratio of cooling area to structural area. The cooling area is established by the open passages 196, while the nodes 192 and branches 194 determine the amount of structural area. In one embodiment, the amount of cooling area exceeds the structural area (cooling area>structural area). In another embodiment, a ratio of the cooling area to the structural area is less than 1 (cooling area<structural area). In yet another embodiment, a ratio of the cooling area to the structural area is between 1 and 4. Other configurations are also contemplated.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A component, comprising:
  a body portion; and
  a cooling scheme disposed inside said body portion, said cooling scheme including:
    a vascular engineered lattice structure including a lattice cavity defined between internal surfaces of said body portion and external surfaces of said vascular engineered lattice structure, said vascular engineered lattice structure defined by a plurality of nodes and a plurality of branches each extending from at least one of said plurality of nodes, with at least some of said plurality of branches and at least some of said plurality of nodes being spaced apart from said internal surfaces defining said lattice cavity; and
    a heat transfer device adjacent to said vascular engineered lattice structure, said heat transfer device defined along said internal surfaces.

2. The component as recited in claim 1, wherein said vascular engineered lattice structure is a solid structure in which airflow is communicated around and over said plurality of nodes and said plurality of branches.

3. The component as recited in claim 1, wherein said body portion is part of an airfoil.

4. The component as recited in claim 1, wherein said body portion is part of a combustor liner panel.

5. The component as recited in claim 1, wherein said heat transfer device is disposed upstream from said vascular engineered lattice structure.

6. The component as recited in claim 1, wherein said heat transfer device is disposed downstream from said vascular engineered lattice structure.

7. The component as recited in claim 1, wherein said heat transfer device includes a plurality of trip strips.

8. The component as recited in claim 1, wherein said heat transfer device includes a plurality of pins.

9. The component as recited in claim 1, wherein said heat transfer device includes a plurality of dimples.

10. The component as recited in claim 1, wherein said heat transfer device includes a plurality of chevron trip strips.

11. The component as recited in claim 1, wherein said heat transfer device is a first heat transfer device, and said cooling scheme includes a second heat transfer device different from said first heat transfer device.

12. The component as recited in claim 1, wherein said vascular engineered lattice structure is a hollow vascular structure in which airflow is communicated inside hollow passages of said plurality of nodes and said plurality of branches.

13. The component as recited in claim 12, wherein said hollow passages include respective internal passages defined within each node of said plurality of nodes and within each branch of said plurality of branches for communicating fluid, at least some of said plurality of nodes directly connected to four of said plurality of branches, and said internal passages being distinct from said lattice cavity.

14. The component as recited in claim 13, wherein said body portion is part of a combustor liner panel.

15. The component as recited in claim 13, wherein said first heat transfer device is a first transfer device, said vascular engineered lattice structure is disposed upstream from said first heat transfer device, and said cooling scheme includes a second heat transfer device different from said first heat transfer device, each of said first and second heat transfer devices protruding from said internal surfaces of said body portion.

16. The component as recited in claim 13, wherein:
said body portion is part of an airfoil extending between leading and trailing edges and between pressure and suction side walls;
said lattice cavity is a portion of a slot that extends in a chordwise direction from a rib and to an opening at the trailing edge, said rib extending between said pressure and suction side walls;
said hollow vascular structure is disposed directly downstream from said heat transfer device such that fluid is communicated in said slot across said heat transfer device and then over and around said external surfaces of said hollow vascular structure defined by said plurality of nodes and said plurality of branches;
said first heat transfer device is a first heat transfer device; and
said cooling scheme includes a second heat transfer device different from said first heat transfer device, each of said first and second heat transfer device protruding from surfaces of said slot.

17. The component as recited in claim 16, wherein each of said first heat transfer device and said second heat transfer device is a non-vascular structure defined downstream of said rib, said rib is spaced apart in said chordwise direction from said leading and trailing edges, and said rib extends in a spanwise direction to bound an upstream most portion of said slot.

18. The component as recited in claim 17, wherein said first heat transfer device includes one of a plurality of trips strips, a plurality of chevrons, and a plurality of dimples, and said first heat transfer device is defined along a first slot wall of said slot but is spaced apart from a second slot wall of said slot that is opposed to said first slot wall.

19. A component, comprising:
a wall;
a cooling scheme formed inside said wall, said cooling scheme including a vascular engineered lattice structure and a first heat transfer device different from said vascular engineered lattice structure;
wherein vascular engineered lattice structure includes a lattice cavity defined between internal surfaces of said wall and external surfaces of said vascular engineered lattice structure, said vascular engineered lattice structure defined by a plurality of nodes and a plurality of branches each extending from at least one of said plurality of nodes, with at least some of said plurality of branches and at least some of said plurality of nodes being spaced apart from said internal surfaces defining said lattice cavity; and
wherein first heat transfer device is defined along said internal surfaces of said wall.

20. The component as recited in claim 19, wherein said vascular engineered lattice structure is disposed upstream from said first heat transfer device.

21. The component as recited in claim 19, wherein said vascular engineered lattice structure is disposed downstream from said first heat transfer device.

22. The component as recited in claim 19, wherein said first heat transfer device includes one of trips strips, chevrons, pins and dimples.

23. The component as recited in claim 19, wherein said cooling scheme is disposed in a trailing edge portion of said component.

24. The component as recited in claim 19, wherein said cooling scheme includes a second heat transfer device different from said first heat transfer device.

25. The component as recited in claim 24, wherein said cooling scheme includes a third heat transfer device different from each of said first heat transfer device and said second heat transfer device.

\* \* \* \* \*